Dec. 23, 1969  R. E. McCURDY  3,485,471
PROJECTOR SCREEN SUPPORTING ASSEMBLIES
Filed Nov. 20, 1967
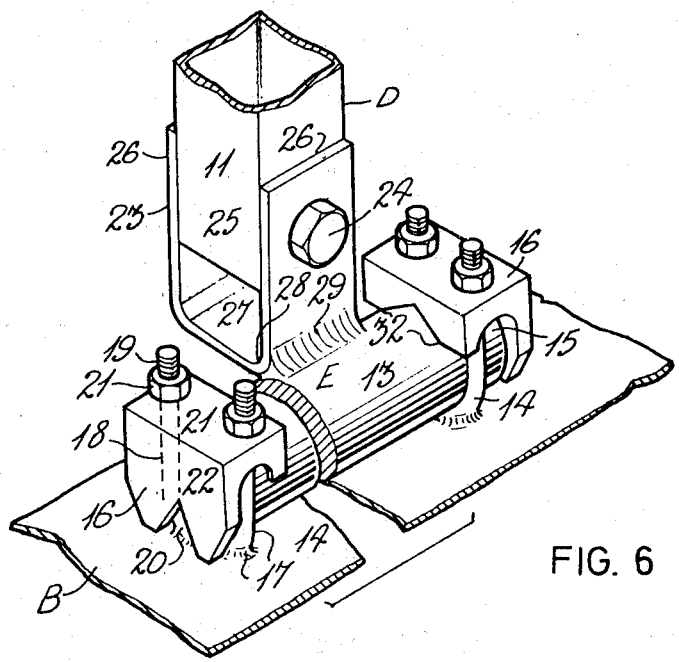
FIG. 6
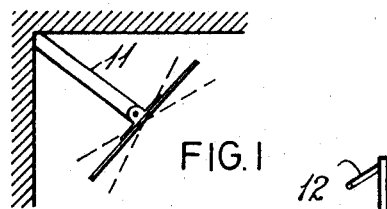
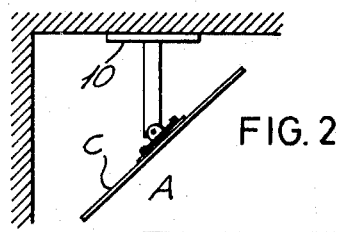
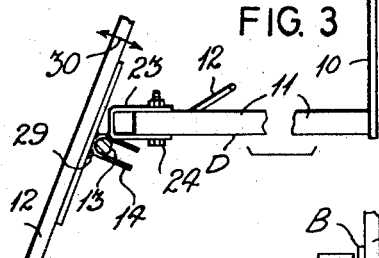
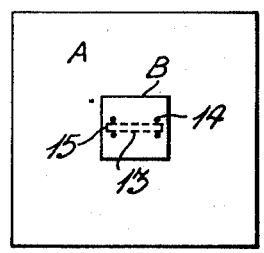
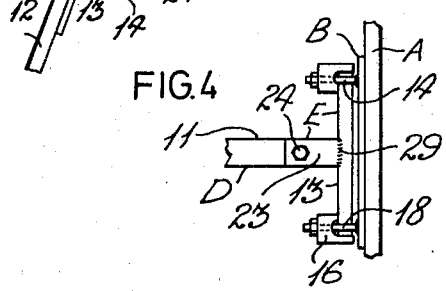
*INVENTOR.*
RONALD E. McCURDY
BY
Attorney

United States Patent Office 3,485,471
Patented Dec. 23, 1969

3,485,471
PROJECTOR SCREEN SUPPORTING ASSEMBLIES
Ronald E. McCurdy, 275 Jeffcoat Drive,
Rexdale, Ontario, Canada
Filed Nov. 20, 1967, Ser. No. 684,283
Claims priority, application Canada, Nov. 21, 1966,
975,949
Int. Cl. A47g 1/24
U.S. Cl. 248—487                     1 Claim

ABSTRACT OF THE DISCLOSURE

A projector screen is secured substantially centrally upon its rear side to a mounting plate to which is connected a universal joint assembly. Extending from this assembly is a tubular bracket adapted for wall, tripod or the like mounting. The stated arrangements facilitate aiming the screen from the most suitable location, particularly in a classroom, directly at the projector from any position of the latter.

---

The present invention relates to projector screen supporting assemblies, the basic inventive concept being to provide means of the character herewithin described in virtue of which a screen designed for the projection thereonto of an image from a projector, may be aimed accurately at said projector so that the incident light from the projector strikes the screen surface at right angles and hence eliminates distortion of the projected image.

Most attempts to rectify image distortion known to the present inventor have been adaptations of screens which were in use before the widespread introduction of "Overhead projectors" (by which expression—though not necessarily—is generally meant special horizontal transparent stage usually of some 11 x 11 inches, strongly illuminated from below, and upon which the teacher writes, or places a transparent film, facing the class, the light being projected upwardly onto a lens system located a variable distance over the lighted surface, and angularly adjustable, the light from the lens system being projected onto the screen).

It is such projectors as have been briefly described hereinabove, operated at the front of the teacher area usually, and fairly near the screen, which have been responsible primarily for the need of a new type of screen and screen supporting assembly or screen mounting bracket assembly constituting the present invention.

Commonly, image distortion is offset by the use of hardware designed to fasten the conventional roll-up type screen away from the wall at the top so that the same may be tied near the wall at its base or else left hanging vertically, depending upon the position of the projector. This method of adjustment to projector position, however, results in rapid failure of the roll-up mechanism, ripples in the flexible screen surface, and almost prohibitive costs in the case in which corner mounting in a room with suspended ceiling is desired.

Another method of correcting screen position has been introduced which makes use of bows at either end of a plastic sheet. The bows operate to stretch the material and to slide in wall brackets which allow forward-and-backward tilting of the screen. This type of screen however also presents several difficulties of which one is that frequently the screen may catch upon the blackboard moulding, another being that it may slip free of its retaining brackets.

Still another drawback of this type of screen however resides in its small size and rectangular shape. It is too small to meet the demands teachers are making of overhead projectors, and limits the shape of transparencies to those with the small dimensions along the sides. Finally it should be noted that neither of the screen types referred to above can be adjusted to face the left or right after the same is mounted. This eliminates the possibility of positioning the projector in any part of the room other than along a line at right angles from the screen position.

The foregoing disadvantages may be overcome through the use of a rigid screen mounted in the universal manner which will be described herein. The screen may be used with equal facility in a corner of a room, as in the centre thereof. Additionally, it permits the screen to be aimed at a projector in any part of the room which is convenient to wall outlets, position of the teacher's desk or organization of the classroom. Since the screen is mounted at or in the vicinity of its geometric centre, high frictional resistance against the relatively sliding interfaces of the universal connection assembly forming part of the present invention is not necessary for self-maintaining adjustment, and because of this method of mounting, very little effort is required for movement of the screen to the desired angle by the teacher or person concerned.

With the foregoing in view, and such other objects, purposes or advantages as may become apparent from consideration of this disclosure and specification the present invention consists of the novel concept exhibited in the method, process, contruction, arrangement of parts, or new use of any of the foregoing herein particularly exemplified in one or more specific embodiments of such concept, reference being had to the accompanying figure in which:

FIGURE 1 is a schematic plan representation of the present invention shown projecting from the corner of a room.

FIGURE 2 is similar to FIGURE 1 but depicting the bracket as fastened away from a room corner.

FIGURE 3 is a fragmentary elevation, also semi-schematically represented, of the present invention.

FIGURE 4 is a fragmentary plan representation of the invention semi-schematically represented.

FIGURE 5 is a schematic posterior representation of the screen mounting structure of plate, and associated pair of U-bolts or screw-threaded posts secured as by welding to the said mounting plate.

FIGURE 6 is a fragmentary perspective representation of the present invention.

In the drawings, like characters of reference designate similar parts in the several figures.

Essentially the present invention is usable for firmly positioning a projector screen A at any desired angle, within limits, for placing said screen in substantially any desired location in a classroom or the like, the same comprising in combination a screen mounting structure collectively designated B secured against the rear surface C of said screen, a bracket assembly collectively designated D, and a universal connection assembly collectively designed E, the universal connection assembly being adjustable to the requisite amount of frictional resistance against its relatively sliding interfaces, between said mounting structure B and bracket assembly D, and connected to each, said mounting structure B occupying a relatively small area relative to that of screen A, and in substantially the geometrical centre of the screen as best depicted in the accompanying FIGURE 5.

Proceeding now to describe the present inventive concept in terms of the particular exemplification thereof according to the accompanying drawings, screen mounting structure B is preferably in the form of a substantially flat plate adhesively or in any other way desired, secured interfacially to the rear surface of screen A. As will clearly be seen by best reference to the accompanying FIGURE 5 it occupies a small area relative to that of the screen and is substantially the geometrical centre thereof.

Bracket assembly D comprises a wall mounting element 10 in the form of a plate of any desired contour, the (preferably) square tubular support bar 11 projecting from the said plate, and a diagonal brace 12.

The universal connection assembly E, considered as a whole is essentially confined within those produced planes which lie on the boundary of mounting structure or plate B and which are normal to the rear surface of the screen. Such universal connection assembly comprises two parts: that is to say, (i) the primary rotatable hinge pin 13 and pair of spaced bearings 14 in which the pin is journalled, and beyond which the opposite ends 15 of the pin project, and (ii) the pair of thrust-bearing shackles 16.

The spaced bearings 14 are in the form of U-bolts secured rigidly, as by welding 17 to mounting structure B and such bolts or bearings each embody a pair of spaced posts 18 screw-threaded at 19, together with the connecting pieces 20 therebetween, it being understood that posts 18 project through apertures provided in the upper horizontal surface portions 21 of the shackles 16. Screw-threaded tightening elements in the form of the hexagonal nuts 21 connect the bearings to the shackles. The end plate portions 22 prevent end-wise movement of the primary hinge pin 13.

The universal connection assembly E may also be said to comprise the two parts of which one embodies a clevis collectively designated 23 and a secondary rotatable hinge pin 24 by means of which the clevis is rotatably journalled to the distal end 25 of bracket assembly D.

The clevis 23 is generally of squared U-configuration consisting of the pair of arms 26 and connecting piece 27. The said clevis is secured centrally between the ends of primary pin 13, with substantially the junction 28 of one of arms 26 and connecting piece 27 secured, as by welding 29 to the surface of pin 13 upon a longitudinal axial plane thereof. Thus it will be recognised that the longitudinal axis of support bar 11 is offset from, or to one side of, an axial plane of the primary hinge pin 13 as is clearly depicted in the accompanying FIGURES 3 and 6.

It will be seen from all the foregoing in conjunction with the accompanying drawings that mounting structure B is in the form of a substantially flat plate and that the aforesaid spaced bearings in the form of U-bolts rotatably accommodate and secure primary hinge pin 13. As a result of this arrangement the screen A is adjustable about the primary pin 13 in a vertical plane as indicated by double headed arrow 30. In virtue of the universal connection assembly E being connected to support bar 11 via the clevis 23 and the secondary hinge pin 24 which transfixes the said clevis and support bar, the screen A is rotatable in horizontal planes as best illustrated in the accompanying FIGURE 1.

In virtue of the "corner mounting," or welding of the primary hinge pin 13 to one of the angular edges 28 of the clevis 24 it would be apparent that screen A may move through an arc 30 of substantial radius. The fact that support bar 11 is of square tubular section and that the arms 26 of clevis 23 are in interfacing contact with two opposite sides of the said bar, a particularly rigid connection is achieved.

When the nuts 21 are well tightened down upon the surfaces 21, it will be appreciated that primary hinge pin 13 is held at the points 32 to the shackles 16 in point contact and in line contact underneath having regard to the cylindrical configuration of the bearings 14 including the connecting pieces 20 thereof.

From all the foregoing it will be apparent that the location of the primary hinge where indicated at the junction of the clevis or substantially so, provides the ability, as well exemplified in the accompanying FIGURE 3, of permitting vertical rotation of the screen through a wide arc including, should the occasion require, rotation into the horizontal, in other words such that the plane of the screen is parallel with the floor. However it should be noted that in this figure (as may occasionally be preferred), the brace 12 is shown inclining diagonally from above downwardly toward the support bar 11. More usually the brace 12 will incline upwardly from below in which case the wall mounting element 10 will be reversed from the position shown in FIGURE 3—in fact as if FIGURE 3 were viewed in reverse with respect to the said support bar and brace (in which case of course the primary hinge pin 13 would be welded to the opposite corner of clevis 23).

Various modifications can be made within the scope of the inventive concept disclosed. Accordingly, it is intended that what is set forth herein should be regarded as illustrative of such concept.

What is claimed is:

1. For use in firmly positioning a projector screen at any desired angle within limits and for placing said screen in substantially any desired location in a classroom or the like, in combination, a screen mounting structure to which a screen is operatively connected at the rear of said screen, a bracket assembly and a universal connection assembly adjustable to the requisite amount of frictional resistance against its relatively sliding interfaces between said mounting structure and said bracket and connected to each, said mounting structure occupying a small area relative to that of said screen, in substantially the geometrical center of said screen, said universal connection assembly comprising two parts one of which embodies a primary rotatable hinge pin, a pair of spaced bearings in which said pin is journalled and outwardly beyond which the opposite ends of said pin project, and a thrust-bearing shackle enclosing each of said opposite ends and means for connecting said bearings and shackles, said spaced bearings being in the form of U-bolts secured rigidly to said mounting structure and consisting of a pair of spaced and screw-threaded posts and connecting pieces therebetween, said posts projecting through said shackles and said means for connecting said bearings and shackles, comprising screw-threaded tightening elements securable to said screw-threaded posts.

References Cited

UNITED STATES PATENTS

| 559,951 | 5/1896 | Rhind et al. | 248—278 |
| 2,037,303 | 4/1936 | Battee | 248—278 X |
| 3,362,671 | 1/1968 | Johnson | 248—324 |

FOREIGN PATENTS

| 26,737 | 5/1904 | Great Britain. |

EDWARD C. ALLEN, Primary Examiner

FRANK DOMOTOR, Assistant Examiner

U.S. Cl. X.R.

248—278, 284; 287—14